United States Patent
Lederer (10) Patent No.: US 10,389,670 B2
(45) Date of Patent: *Aug. 20, 2019

(54) METHOD AND DEVICE FOR MANAGING COMMUNICATION ACTIVITIES

(71) Applicant: Unify GmbH & Co. KG, Munich (DE)

(72) Inventor: Thomas Lederer, Herrsching (DE)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,421

(22) Filed: Mar. 22, 2018

(65) Prior Publication Data

US 2018/0212913 A1 Jul. 26, 2018

Related U.S. Application Data (63) Continuation of application No. 14/200,758, filed on Mar. 7, 2014, now Pat. No. 9,961,031.

(30) Foreign Application Priority Data

Mar. 12, 2013 (DE) .......................... 10 2013 004 363

(51) Int. Cl.
*G06F 15/16* (2006.01)
*H04L 12/58* (2006.01)

(52) U.S. Cl.
CPC ............ *H04L 51/22* (2013.01); *H04L 51/16* (2013.01)

(58) Field of Classification Search
CPC ..... H04L 12/585; H04L 12/58; H04L 12/581; G06Q 10/107

USPC .......................................................... 709/206
See application file for complete search history.

(56) References Cited

U.S. PATENT DOCUMENTS

| | | |
|---|---|---|
| 2002/0087646 A1 | 7/2002 | Hickey et al. |
| 2004/0133810 A1 | 7/2004 | Brischke |
| 2005/0160145 A1 | 7/2005 | Gruen et al. |
| 2006/0015533 A1* | 1/2006 | Wolf ................... G06Q 10/107 |
| 2008/0177845 A1* | 7/2008 | Bracewell ............... H04L 51/22 |
| | | 709/206 |
| 2011/0159854 A1 | 6/2011 | Kedefors |
| 2011/0207484 A1 | 8/2011 | Karnam Holal et al. |

(Continued)

*Primary Examiner* — Alan S Chou
(74) *Attorney, Agent, or Firm* — Buchanan Ingersoll & Rooney PC (57) ABSTRACT

A method is disclosed for managing communication processes (N1-N4) between internal participants (A, B, C) of an internal communication network on the one hand and external participants (E) on the other hand. First a list is set up in an internal communication network that contains incoming and outgoing communication activities between the internal participants and at least one external participant as a virtual mailbox. This virtual mailbox is assigned to the at least one external participant and is set up to be invisible or inaccessible to the at least one external participant. Communications activity between an internal participant and the external participant are recognized as being associated with the external participant based upon identification that has been assigned to the external participant and can be obtained from the communication activity. Each communication activity that has been recognized as being associated with the external participant is deposited in the virtual mailbox.

20 Claims, 7 Drawing Sheets

(56) References Cited

U.S. PATENT DOCUMENTS

2012/0237008 A1 9/2012 Yasrebi et al.
2013/0041912 A1 2/2013 Arora et al.

* cited by examiner

Fig. 1

Prior art

Prior art

Fig. 5

Prior art

Fig. 6

Prior art

METHOD AND DEVICE FOR MANAGING COMMUNICATION ACTIVITIES

CROSS-REFERENCE TO RELATED APPLICATIONS

This application is a continuation application of U.S. patent application Ser. No. 14/200,758, which claims priority to German Patent Application No. DE 102013004363.8, filed on Mar. 12, 2013.

FIELD OF INVENTION

The invention relates to a method and a device for managing communication activities.

BACKGROUND OF THE INVENTION

In communication networks with multiple internal participants, including but not limited to those in larger companies, communication with external partners such as business partners, customers, etc. is often confusing. External persons can exploit this by means of targeted verbal or written approaches to different potential internal contact partners, in order to gain some advantages based on different and potentially inconsistent replies. In conventional communication systems, an external person E may communicate with several internal persons A, B, C, or conversely several internal persons may communicate with the same external person E, without the internal persons A, B, C, . . . knowing of each other or of their communication with the external person E. Thus, the external person E may receive differing and uncoordinated pieces of information. It is therefore easy for the external person E to exploit this situation by, for example, sending inquiries as separate electronic messages (e-mails or the like) separately to persons A, B, C.

Figure 3:
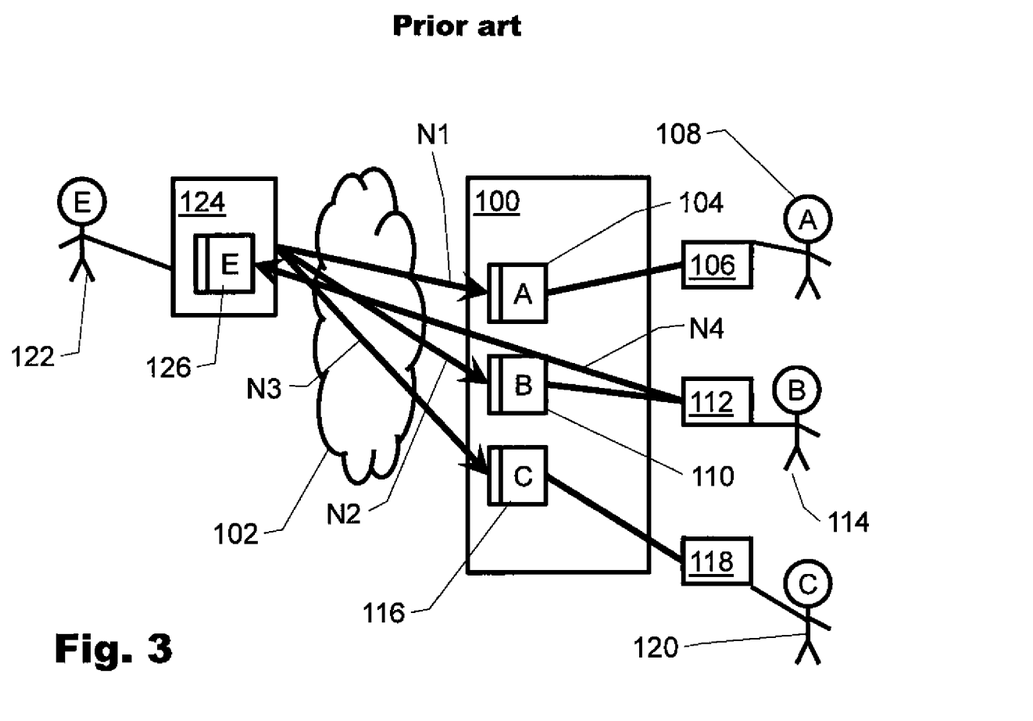
FIG. 3 is a block diagram illustrating handling of a message by a mail server of the prior art.

Such an arrangement is illustrated in FIG. 3. FIG. 3 shows a mail server 100 of a company network for a company XYZ that is connected to the internet 102 via not-illustrated means such as a gateway or the like. The mail server 100 manages a mailbox 104 that is accessible by a mail client 106. The mail client 106 may be set up on a workstation for which a person 108 (person A) has a user profile. Instead of being set up on a workstation, the mail client 106 can also be set up on a smartphone, tablet or laptop computer or another such device. Below, mailbox 104 will also be referred to as the mailbox of person A because it is set up exclusively for and assigned to person A (108). Mailbox 104 can be addressed from the outside via the Internet 102, for example by using the address personA@companyXYZ.com. Likewise, the mail server 100 manages a mailbox 110, which can be accessed by a mail client 112 of a person 114 (person B), and which can be addressed, for example, using the address personB@companyXYZ.com and a mailbox 116, which can be accessed by a mail client 118 of a person 120 (person C), and which can be addressed, for example, using the address personC@companyXYZ.com. An external person 122 (person E) has access to a mail server 124 with a mailbox 126 via not-illustrated means, which can be addressed, for example, using the address personE@fremderServer.net. In the shown situation, person E sends three messages N1, N2, N3 via the internet using server 124 and using the addresses of the mailboxes 104, 110, 116 of the internal persons A, B, C. The messages N1, N2, N3 are received in the mail server 100 and assigned to or deposited in the mailboxes 104, 110, 116. i.e., message N1 is deposited in mailbox 104 of person A, message N2 in mailbox 110 of person B and message N3 in mailbox 116 of person B. Person B replies to message N2 with a message N4.

Figure 4A:
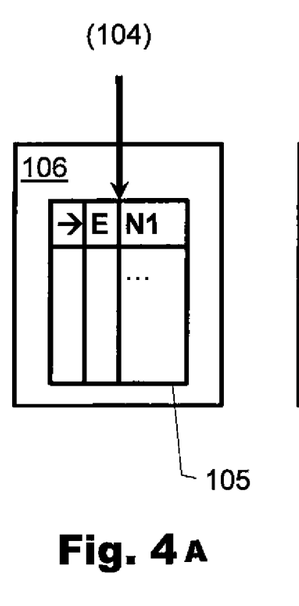
FIGS. 4A to 4C are block diagrams illustrating handling of a message by mail clients of respective internal persons according to the prior art.
Figure 4B:
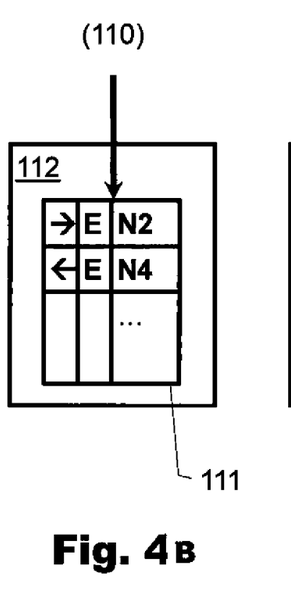
Figure 4C:
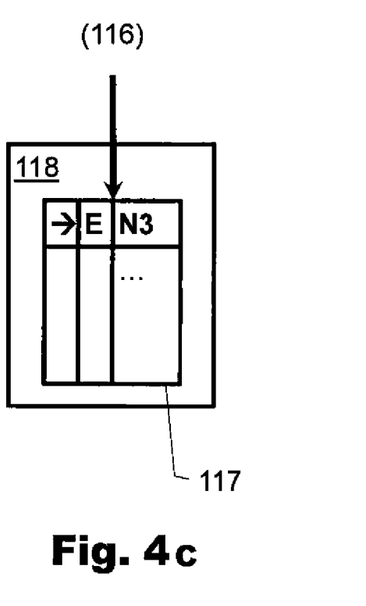

FIGS. 4A to 4C show the situation from the perspective of persons A, B, C, or more precisely the perspective of person A on a message list (postbox) 105 of mailbox 104 illustrated by mail client 106, the perspective of person B on a message list (postbox) 111 of mailbox 110 illustrated by mail client 112 and the perspective of person C on a message list (postbox) 117 of mailbox 116 illustrated by mail client 118. As illustrated in FIG. 4A, only the message N1 addressed to person A appears in the message list 111 of person A; as illustrated in FIG. 4B, only the message N2 addressed to person B as well as the response of person B, message N4, to the external person E appears in the message list 105 of person B; and as illustrated in FIG. 4C, only the message N3 addressed to person C appears in the message list 117 of person C. Thus, persons A, B, C have no knowledge of the fact that the respective other two persons were sent a message and neither person A nor C can see the reply N4 of person B.

Figure 5:
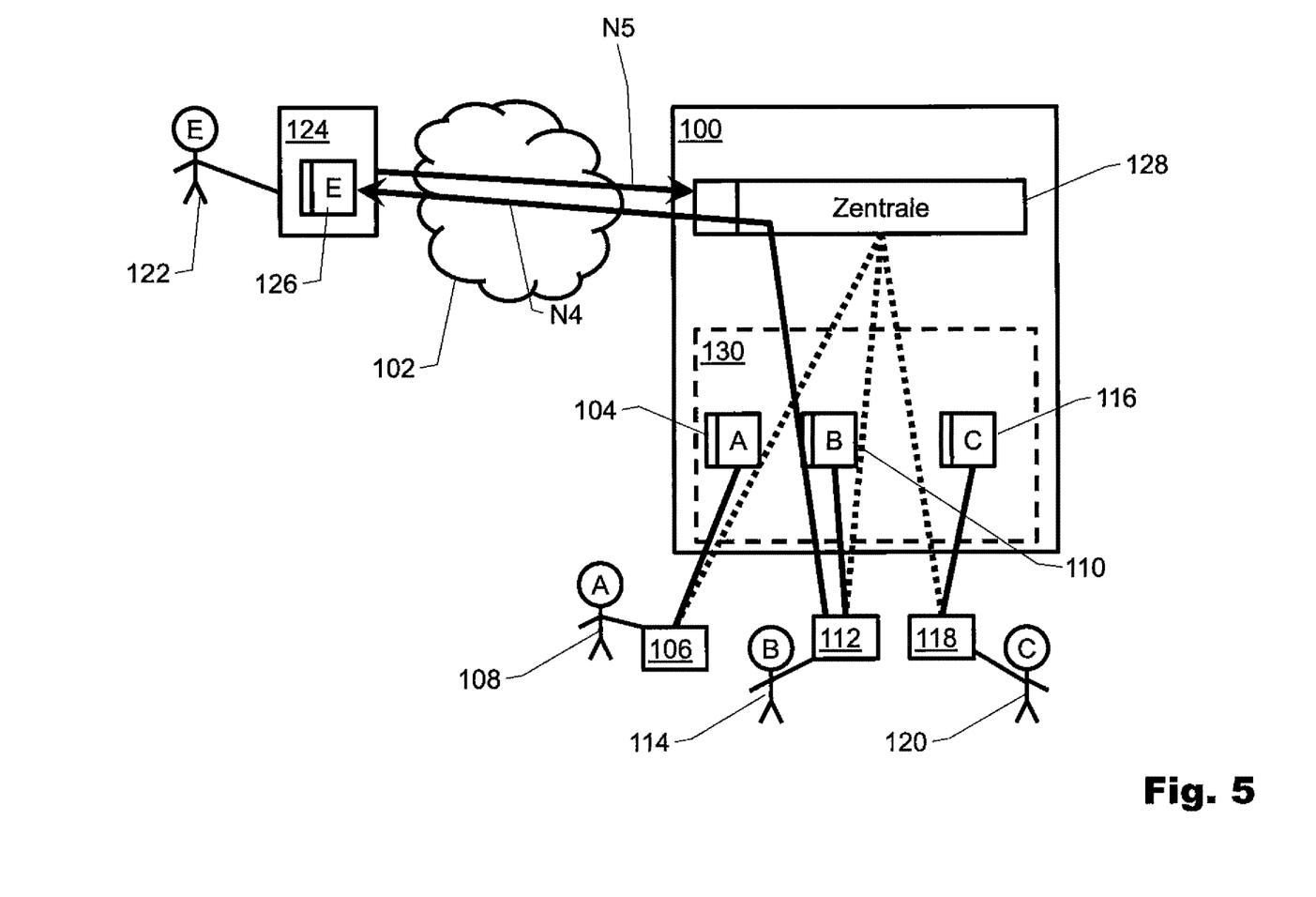
FIG. 5 is a block diagram illustrating handling of a message by a mail server according to another prior art.

To work around this problems, various work-around solutions have been employed to date. FIG. 5 illustrates a case where a central mailbox 128 is set up in the previously described mail server 100 and can be addressed via the internet 102 from the outside using the address Zentrale@companyXYZ.com. Furthermore, an internal area 130 is defined in which the person-related mailboxes 104, 110, 116 of persons A, B, C are set up. The internal area 130 cannot be addressed from the outside via the internet; rather the mailboxes 104, 110, 116 serve only the internal communication inside the company XYZ. Different from FIG. 3, the mail clients 106, 112, 118 of persons A, B, C not only have access to their own mailboxes 104, 110, 116 but also at least read access to the central mailbox 128. I.e., all internal persons A, B, C can read a message N5 that has been directed via the internet to the central mailbox 128 and deposited there. In this arrangement, messages directed from the outside to the internal mailboxes 104, 110, 116 are rejected. Alternatively, messages directed from the outside to the internal mailboxes 104, 110, 116 can also go to the central mailbox 128; however, this may not be desirable due to privacy issues of persons A, B, C. Messages directed to the outside can be provided with the identification of the central mailbox 128 such that the personal mailboxes 104, 110, 116 remain hidden to the outside.

Such a solution according to FIG. 5 can be perceived as impersonal by external persons such as person E and can be an obstacle to establishing contact. Instead of a central mailbox, several group mailboxes may be set up for different departments or work groups within the company XYZ and may be visible to a limited number of people. However, aside from the increased management effort for assigning access rights, the problem of an impersonal appearance toward the outside remains essentially the same. In addition, it is difficult for outsiders to assign the correct group address when attempting to contact a certain person inside company XYZ.

Figure 6:
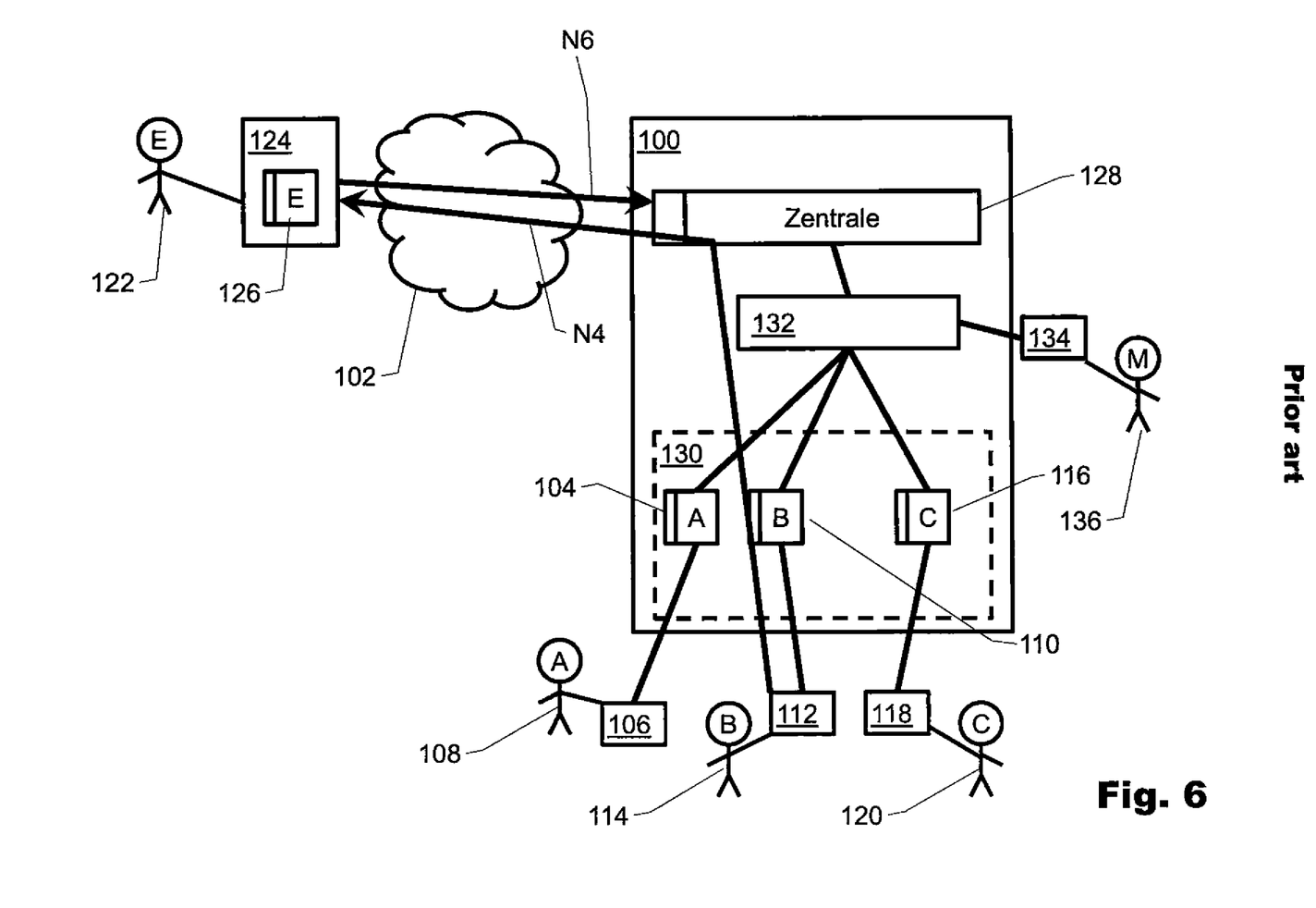
FIG. 6 is a block diagram illustrating handling of a message by a mail server according to an additional prior art.

In a variation of the solution described above and illustrated in FIG. 6, the central mailbox 128 is managed additionally by an administrative entity 132 that can be accessed by a manager 136 (person M) via a management client 134, which is set up as a workstation, for example. Forwarding of messages that have arrived at the central mailbox 128 via the internet 102, for example, is coordinated centrally via the administrative entity 132, i.e., the management client 132 and/or the administrator 136 decide to which internal mailbox 104, 110 and/or 116 a message N6 shall be forwarded based on message header elements or contents of the incoming message N6. Although this solution protects the privacy of persons A, B, C in relation to each other, it is just as impersonal to the outside and requires great expenditure in personnel and a high degree of alertness, since this cannot always be automated.

Figure 7:
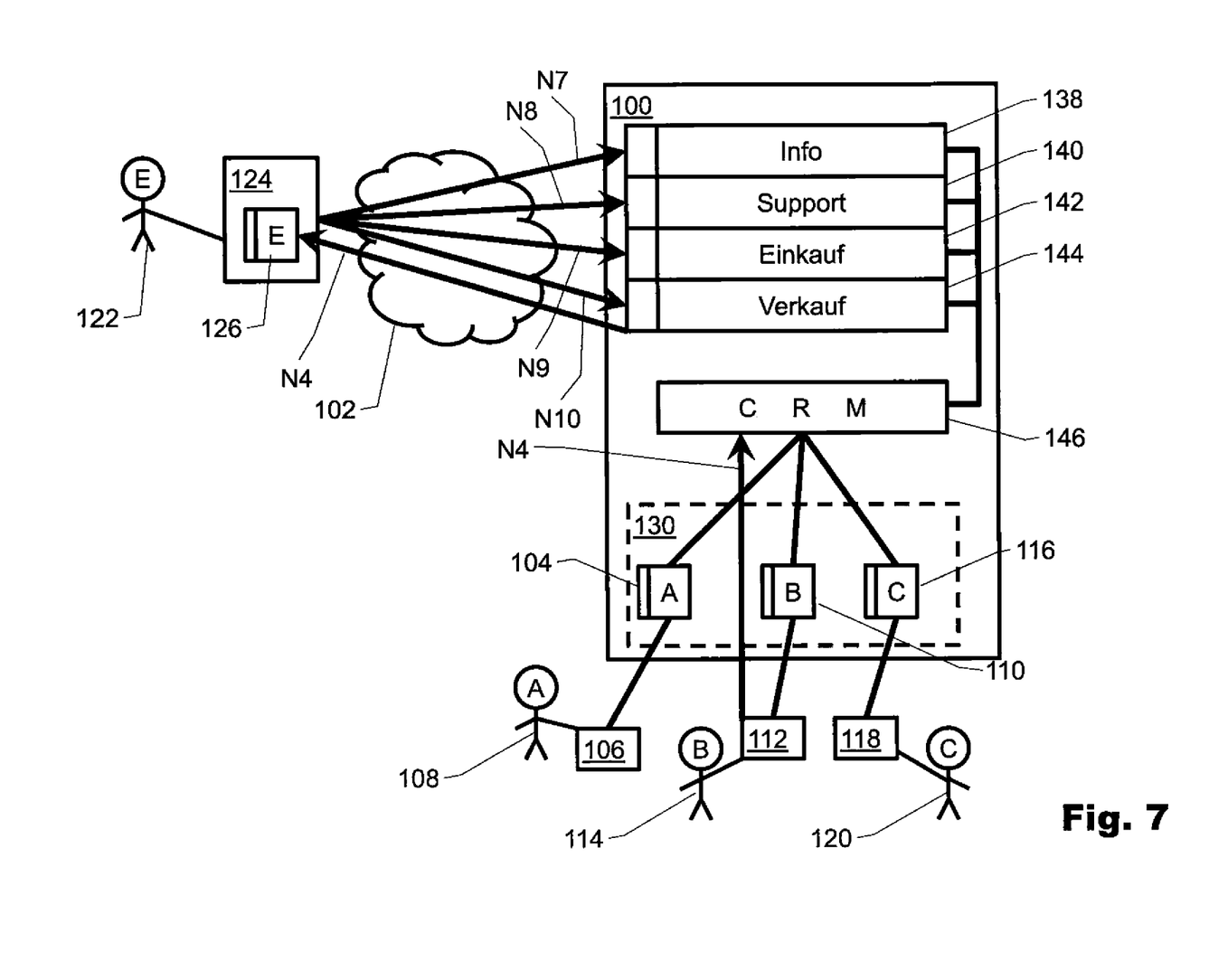
FIG. 7 is a block diagram illustrating handling of a message by a mail server according to yet another prior art.

FIG. 7 shows a similar system in which multiple group mailboxes 138, 140, 142, 144 are set up that can be addressed from the outside via the internet 102 using their respective group e-mail address such as info@companyXYZ.com, support@companyXYZ.com, einkauf@companyXYZ.com, verkauf@companyXYZ.com. The group mailboxes 138-144 are managed via a customer relationship system (CRM system) 146. The internal persons A, B, C are provided the ability to see all requests and replies via the group mailboxes 138-144 using a web-based system, for example. Even if the external person E dispatches several messages N7-N10 to the respective group mailboxes 138-144, they are combined via the CRM and made transparent toward the inside. The reply N4 of person B is provided by the CRM system 146 with the group e-mail address appropriate for person B (in the shown example verkauf@companyXYZ.com) as the sender and is sent to person E via the internet. However, using the CRM system 146 is expensive and does not cover personal e-mail addresses.

Figure 8:
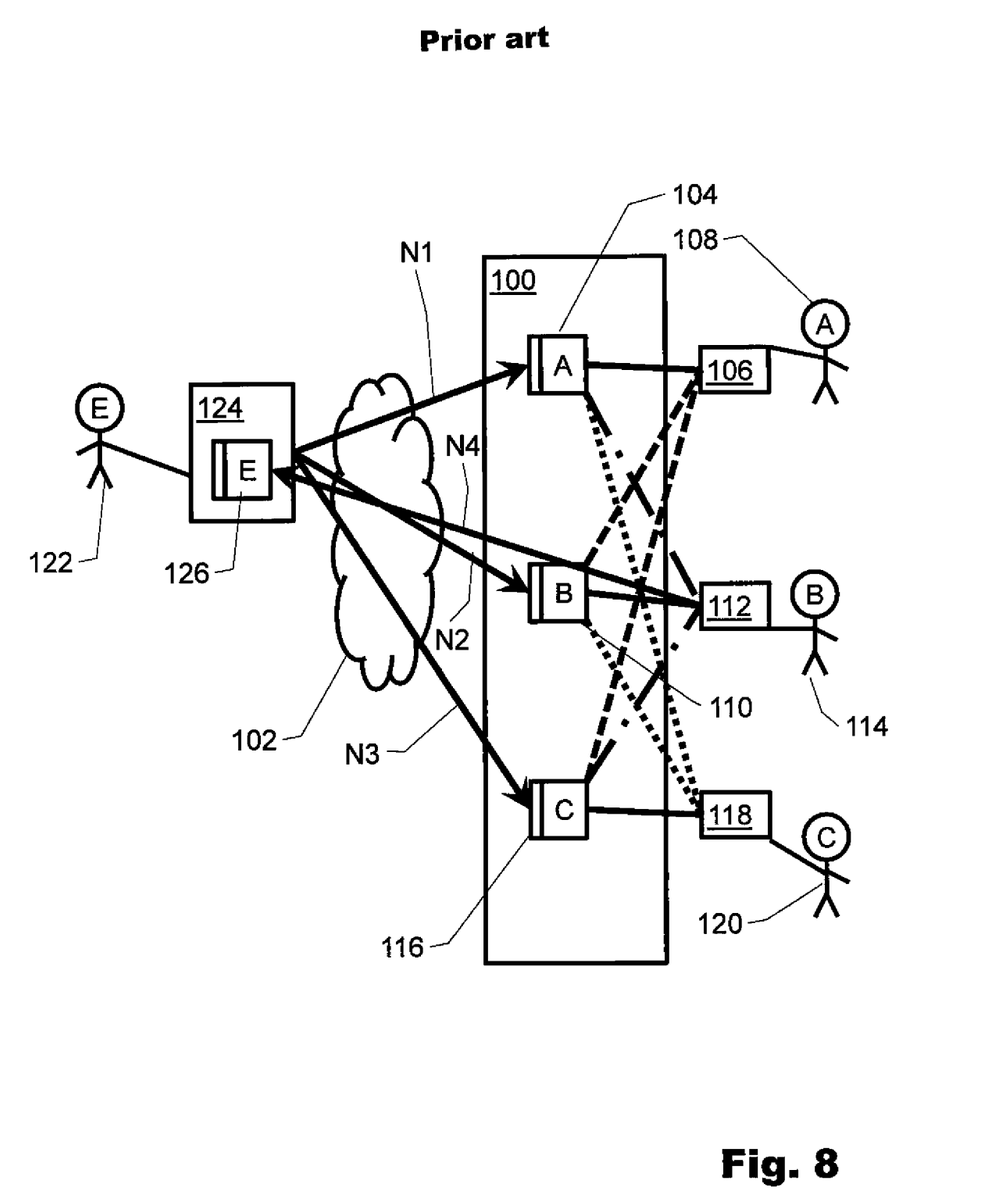
FIG. 8 is a block diagram illustrating handling of a message by a mail server according to a recent prior art.

Another known work-around illustrated in FIG. 8 is to keep the personal mailboxes 104, 110, 116 addressable from the outside but allow internally reciprocating at least read rights for other personal mailboxes. As illustrated in FIG. 8, the mail client 106 of the internal person 108 (person A) has direct access to that person's own mailbox 104 (see solid line between mail client 106 and mailbox 104), i.e., can see incoming and outgoing messages that are deposited in this mailbox or can display them for person A as well as transfer messages that are entered by person A to mailbox 104 of person A for transmission, whereupon mail server 100 provides the message with a message header including the mailbox address of mailbox 104 and sends the message. At the same time, mail client 106 has read access to mailboxes 110, 116 of persons B and C (see dashed lines between mail client 106 and mailboxes 110, 116), i.e., can see messages that are deposited in these mailboxes 110, 116 and display them for person A. The same applies analogously to the communications of persons B and C, i.e., the mail client 112 of person 114 (person B) has direct access to that person's own mailbox 110 (solid line) and read access to the mailboxes 104, 116 (dash-dot lines) of persons A and C, and the mail client 118 of the person 120 (person C) has direct access to that person's own mailbox 116 (solid line) and read access to the mailboxes 104, 110 (dotted lines) of persons A and B. Such a solution is associated with a loss of privacy and is also subject to the problem that, although in principle relevant messages to external persons can also be found on other personal mailboxes, they require a targeted search activity for every act of communication.

A purely manual solution would be to "share" an outgoing message internally by increasing the distribution group, for example. Existing functions of e-mail programs such as CC (carbon copy) or BCC (blind carbon copy) are used for this purpose. However, the CC method has the disadvantage that the distribution group is also revealed to the outside. The BCC method, which avoids this disadvantage, on the other hand increases the internal intransparency because none of the internal recipients know who else received this message. In addition, these solutions require increased discipline and attention in order to consistently select the correct distribution for each communication activity.

In summary, the work-around solutions used to date suffer at least in part from the disadvantages that they present an impersonal image to the outside, for example, or that they require strict, consistent handling by the persons involved.

One goal of the present invention is to eliminate at least in part the disadvantages in the prior art. One particular goal of the present invention is to create consistent communication activity with external participants that is transparent internally and not transparent to the outside.

According to the invention, this goal is achieved at least in partial aspects by the features of the independent claims. Advantageous embodiments and developments of the invention are provided in the dependent claims.

SUMMARY OF INVENTION

According to one aspect of the invention, a method for managing communication activities between internal participants of an internal communication network on the one hand and external participants on the other hand is proposed, wherein the method is executed in the internal communication network and comprises the following steps: setting up a list in the internal communication network for listing incoming and outgoing communication activities between the internal participants and at least one external participant as a virtual mailbox that is assigned to the at least one external participant, wherein the virtual mailbox is set up to be invisible or inaccessible to the at least one external participant; recognizing a communication activity between at least one internal participant and the at least one external participant as being associated with the at least one external participant based on an identification that can be assigned to the at least one external participant and can be obtained from the communication activity; depositing each communication activity that has been recognized as being associated with the external participant in the virtual mailbox; and releasing the virtual mailbox to at least one selected internal participant.

In terms of the invention, any exchange of information that occurs electronically via a communication network is understood to be a communication activity, i.e., in particular an electronic message (so-called e-mail), chat message, voice message, short text message (SMS), telephone or VoIP communication, fax, electronic letter copy, video message, etc. In terms of the invention, a communication network refers to a structure that is set up to exchange communication data between multiple terminal points and that uses for this purpose one or more protocols specified for communication networks, such as TCP/IP, ISDN, FTP or the like. In terms of the invention, an internal communication network refers to a communication network that is only accessible to a restricted group of participants via authorized access such as a LAN, in particular a company network or the like, wherein an internal participant may be any participant that has authorized access to a communication node or communication terminal within the internal communication network, and an external participant is any entity that is located outside the internal communication network but is able to communicate with the internal communication network via an external communication network such as the internet, a telephone network, a radio network or the like. In terms of this invention and within the scope of this application, everything that is part of the internal communication network is designated as internal and everything that is not part of the internal communication network is designated as external.

In terms of the invention, a mailbox is a service that allows access to communication activities such as messages that are deposited therein. Typically, each internal participant is assigned a mailbox in which the internal participant's communication traffic is deposited, wherein the assignment is established via a participant identification of the internal participant. Typically all incoming and outgoing communication activities are stored as respective data elements in a central database, such as a communication database, that is managed by a server. If the communication activity is an electronic message, the data element can be essentially identical to the message but may also contain additional information such as a time stamp, information about previous messages referenced by this message, personal notes, etc. In cases of voice communication, the data element can contain, for example, raw data for a telephone or VoIP contact such as time, duration and connection recognition of the involved participant, potentially an audio stream and/or a communication protocol generated via an ASR machine, in cases of a video contact potentially also an image stream, in other cases, for example, image data or PDF copies or OCR data of a fax, a transmitted image or a video message or the like.) The mailbox service can build a data structure that contains references to the respective data elements in the central database. The data structure can be built at every call-up of the service by a client and only for the duration of an activity by the participant or can be set up permanently in a non-volatile memory or mass storage device and can be updated at a new call-up with communication activities that have been added since the last conclusion. In this case, depositing a communication activity in a mailbox is understood to include a reference to the data element in the central database. The mailbox can be presented to a user who is authorized to access the mailbox in the form of a list from which the user can select one or more messages and display the selected communication activity in its entirety, re-sort the messages or delete them from the mailbox. Fundamentally, the mailbox service can also build its own mailbox structure as a data structure for the respective participant and can store copies, meaning that at least essentially complete reproductions of the communication activities of the respective internal participant are recorded; in this case, depositing a communication activity can be equated with setting up an entire reproduction of the communication activity in the mailbox database. The mailbox service can be carried out either from a communication server or from a communication client of the user; mixed solutions are conceivable as well. In terms of the invention, a virtual mailbox refers to a mailbox that is not specifically assigned to an internal participant. For example, a virtual mailbox may display communication activities that meet certain criteria such as a certain period of a date stamp, the recognition of spam or the like, and can be used for management purposes.

According to this perspective, a present preferred embodiment of the invention is characterized in that a virtual mailbox is set up for but is invisible or inaccessible to at least one external participant. Each communication activity that has been recognized as being associated with the at least one external participant, based on identification, is deposited in the virtual mailbox, and the virtual mailbox is released to all or to at least one selected internal participant, i.e., all internal participants or the at least one selected internal participant. In terms of the invention, identification is information contained in a communication activity that allows for an inference about a participant in the communication activity, such as an e-mail address, a telephone or fax number, a chat name, a reference indicator, a ticket number, a search term in the subject line or a message text, but also an address range such as "all e-mail addresses of a certain domain" (in other words a URL) or the like. In terms of the invention, releasing a virtual mailbox refers to the fact that the virtual mailbox allows access by the internal participant, wherein access includes at least reading. In many cases reading is sufficient and thus access is preferably restricted to reading. However, there may be reasons to allow modification, for example by an administrator. Releasing the virtual mailbox means that the copy of the communication activities deposited in the virtual mailbox is at least visible for the internal participants.

By the fact that the virtual mailbox is released for reading to all or at least one internal participant, the internal participant can not only read his own communication traffic but also view the communication traffic between other internal participants and the external participant and/or take it into account in a subsequent consideration of the external participant. In this manner, all internal participants (for example all employees of a company within a company network), a group thereof, or only one of them can be allowed to have consistent communication with the external participant. Replies from an internal participant to incoming communication activities (e.g., e-mails) can be viewed immediately by the other internal participants, and replies from one internal participant can be coordinated with already given replies from other internal participants. An internal participant can also see every communication activity arriving from the external participant to other internal participants, and the internal participants can therefore coordinate with each other.

The arrangement described above makes it fundamentally possible for all internal participants to have access to the virtual mailbox. If access to the virtual mailbox is to be restricted to a selected participant, then on the one hand it can be ensured that only participants who are or can be dealing with the external person are involved in the communication activities with an external person. On the other hand, it can be avoided that private contacts of an internal participant are exposed within the internal communication network. The selection of participants can be accomplished by assigning access privileges, for example.

By the fact that the virtual mailbox is invisible or not available, for example not accessible, or cannot directly communicate with the at least one external participant, the possibility of internal coordination can be hidden from the outside.

In one concrete embodiment of the invention, multiple virtual mailboxes are set up, each being assigned to at least one external participant. In another embodiment of the invention, the method includes the step of setting up a new virtual mailbox or depositing in a temporary virtual mailbox if a communication activity is not recognized as being associated with an external participant that is assigned to an existing virtual mailbox. In this manner, an administrator may be given the opportunity, for example, to register a previously unknown external participant, to recognize a previously unknown identification of an essentially known external participant and assign said external participant to an existing virtual mailbox, and the like. For this purpose, the newly set-up virtual mailboxes can be indicated as such and after processing can be deleted if the communication activities contained therein can be assigned to an existing virtual mailbox, or can be retained as the virtual mailboxes for the respective new external participants.

In another embodiment of the invention, the method includes the steps of providing a list with communication activities of an internal participant and adding communication activities from one or several virtual mailboxes to the list when the communication activities concern a participant with which the internal participant has communicated previously or is communicating or is preparing to communicate, and if the communication activities are not already contained in the list. Providing a list with the internal participant's own communication activities is included in typical mailbox functions. If communication activities from one or more virtual mailboxes of external participants are added to the list, it is possible for the internal participant to immediately recognize which communication activities have already taken place between other internal participants and the external participant, even if the internal participant has not been involved in the communication activity, not even in copy. This simplifies the coordination of that person's own communication with the external participant and frees the internal participant from the need to consider other internal participants in the distribution because they too are shown their own communication with the external participant. Preparing to communicate can refer to, for example, entering an external participant's address into an address field, dialing an external participant's telephone number or the like, after which, according to the method, other internal participants' communication activities with the external participant are displayed autonomously.

In another embodiment of the invention, adding communication activities from virtual mailboxes is restricted to those virtual mailboxes from which at least one identification corresponds to at least one identification of a communication activity selected by the internal participant from the list provided to the internal participant. In other words, the internal participant sees, when selecting a communication activity from his mailbox, for example by clicking, marking or opening, a display of the communication activities conducted with the external persons involved in the selected communication activity, even if he himself was not involved in these communication activities. At the same time, the internal participant will be spared from other communication activities with external persons that he may not be interested in at the time.

In another embodiment of the invention, adding communication activities from virtual mailboxes can be selected and deselected by the internal participant. As a result, the internal participant can optimize the clarity and user-friendliness of his mailbox list.

In another embodiment of the invention, the method includes the step of distinguishing a communication activity in the list such that one can recognize whether the communication activity is assigned to a virtual mailbox or to the internal person's own mailbox. This simplifies handling and eliminates the need to check each time whether one was a participant in the communication activity.

In another embodiment of the invention, the method includes the steps of recognizing the private nature of a communication activity and preventing a communication activity whose private nature has been recognized from being deposited in the virtual mailbox. The private nature of a communication activity can be indicated, for example, by an identification that is to be set by the internal person who is a participant in the communication activity.

The invention also concerns all devices that are configured to execute the method described above. The problem addressed by the present invention is solved by these devices for the same reasons as the ones stated above for the corresponding method. The device can be a single unit such as a workstation, a mail server computer, smartphone, tablet computer, laptop or the like, a module such as a pc-board to be installed in a device, or can be a system consisting of one or more individual devices and/or modules or a computer network with interconnected devices and/or modules. It is understood that the method can also be embodied in a computer program, a software product or a digital storage medium.

Additional features, tasks, advantages and details of the present invention will become more apparent from the following description of concrete exemplary embodiments and their presentation in drawings in the included figures. It is understood that features, tasks, advantages and details of individual exemplary embodiments are transferrable to other exemplary embodiments and are considered to be disclosed also in connection with the other exemplary embodiments unless this is obviously inapplicable for technical or physical reasons. Exemplary embodiments can be combined with other exemplary embodiments and that combination can also be considered an exemplary embodiment of the invention.

The invention is described below in more detail based on preferred exemplary embodiments and with reference to the figures.

The figures are schematic presentations and are not necessarily drawn according to scale. The illustrations in drawings and the descriptions thereof shall be considered exemplary illustrations of the principle of the invention and shall in no way restrict the invention.

DESCRIPTION OF THE PREFERRED EMBODIMENTS

Figure 1:
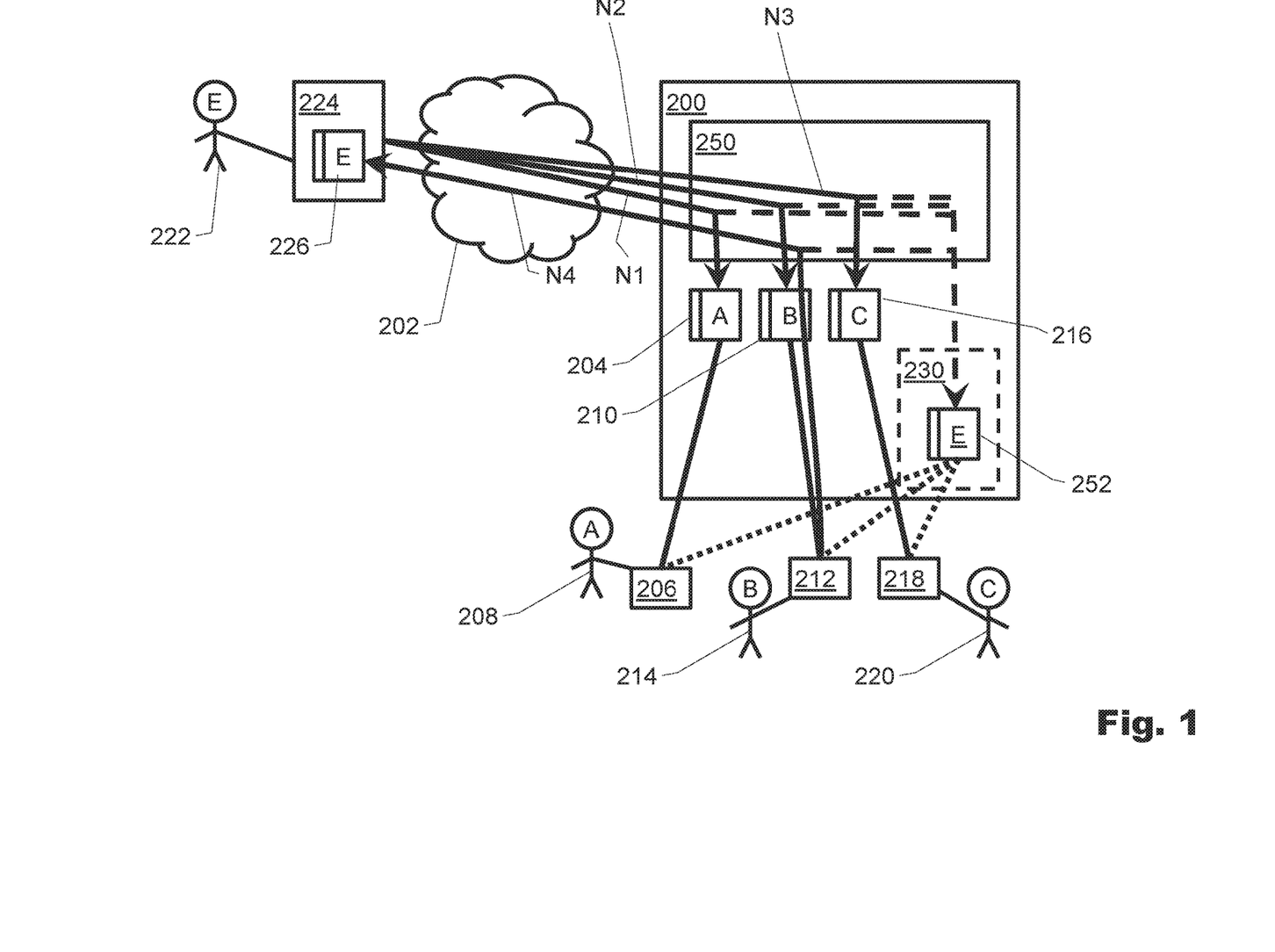
FIG. 1 is a block diagram illustrating handling of a message by a mail server in one exemplary embodiment of the present invention.

A basic exemplary embodiment of the present invention is illustrated in FIG. 1. The illustration in FIG. 1 shows a mail server 200 of a company network for a company XYZ that is connected to the internet 202 via not-illustrated means such as a gateway or the like. The mail server 200 manages a mailbox 204 that is accessible by a mail client 206. This means that the mail client 206 can see and display messages deposited in mailbox 204, and also permits manipulations such as deleting, identifying (for example as spam) messages and the like. Furthermore, the mail client 206 can also dispatch messages via mailbox 204, i.e., can cause the mail server 200 to send a message with the identification of the mailbox 204. This comprehensive administrative access is symbolized in the figure by a solid line. The mail client 206 may be set up on a workstation for which a person 208 (person A) has a user profile. Instead of being set up on a workstation, the mail client 206 can also be set up on a smartphone, tablet or laptop computer or another such device. Below, mailbox 204 will also be referred to as person A's mailbox, because it is set up exclusively for and assigned to person A (208). Mailbox 204 can be addressed from the outside via the Internet 202, for example via the address personA@companyXYZ.com.

Likewise, the mail server 200 manages a mailbox 210 of a person B, which can be accessed comprehensively by a mail client 212 of a person 214 (person B), and which can be addressed, for example, using the address personB@companyXYZ.com, and a mailbox 216 of a person C, which can be accessed comprehensively by a mail-client 218 of a person 220 (person C), and which can be addressed, for example, using the address personC@companyXYZ.com.

It shall be assumed that an external person 222 (person E) has access to a mail server 224 with a mailbox 226 using the internet 202 via not-illustrated means, which can be addressed, for example, using the address personE@fremderServer.net. It shall be assumed further that person E sends three messages N1, N2, N3 to the internal persons A, B, C. I.e., person E causes the external mail server 224 to send the messages N1, N2, N3 via the internet using the addresses of the mailboxes 204, 210, 216. As in the examples of the prior art, it shall finally be assumed that person B replies to message N2 with a message N4.

As shown in FIG. 1, the mail server 200 has a server interface 250 which is set up to mirror incoming and outgoing messages to virtual mailboxes in the manner described below. One such virtual mailbox is illustrated in the figure as an example for any desired number of virtual mailboxes. The virtual mailbox 252 is assigned to the external person E, in other words to the identification of mailbox 226 used by the external person E. Mail server 200 is set up by explicit instruction of a user and/or administrator and/or by automated rules for dynamically setting up and managing virtual mailboxes for external persons. Mail server 200 is also set up to assign a virtual mailbox to several aliases, i.e., alternate identifications, of an external person. The server interface 250 is now set up to mirror any communications concerning the external person E to the virtual mailbox 252 that is assigned to this person, i.e., to deposit each message originating from that person E in both the recipient's mailbox and the virtual mailbox 252, and to send each message directed from a mailbox 204, 210, 216 of an internal person A, B, C to the external person E via the Internet and to deposit it in the virtual mailbox 252.

According to the embodiment shown in FIG. 1, each mail client 206, 212, 218 of the internal persons A, B, C not only has direct access to its own mailbox 204 or 210 or 216, respectively, but also sees the entire message traffic deposited in the virtual mailbox 252 (dotted line). Mail clients 206, 212, 218 are set up to recognize copies of their own mailboxes 204 or 210 or 216, respectively, and to avoid a double display.

Figure 2A:
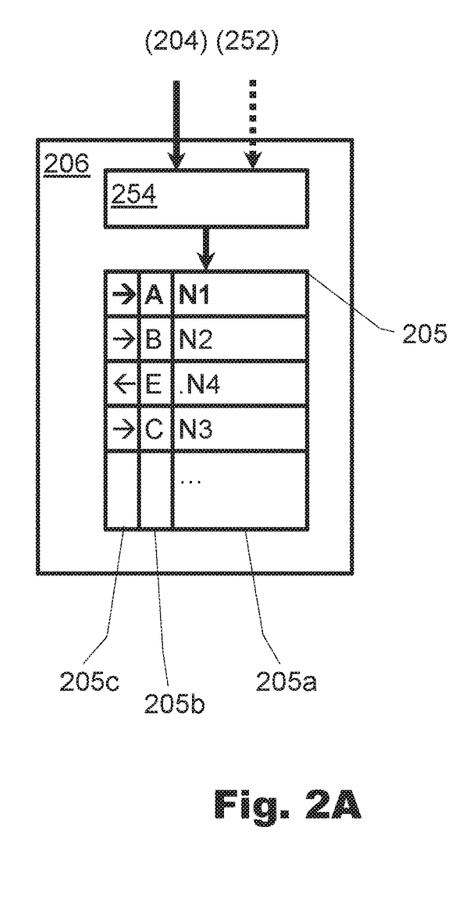
FIGS. 2A to 2C are block diagrams of a message presentation by mail clients of respective internal persons in one exemplary embodiment of the present invention.
Figure 2B:
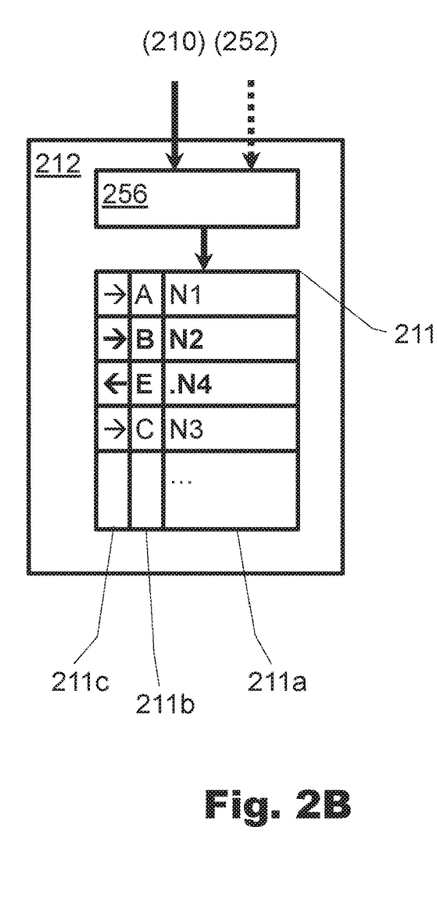
Figure 2C:
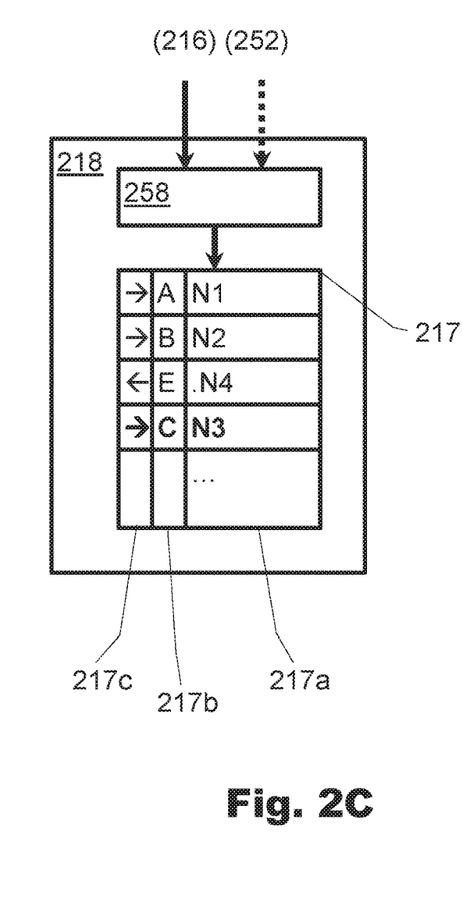

FIGS. 2A-2C illustrate in greater detail the situation from the perspective of persons A, B, C on the message traffic with the external person E. More precisely, FIG. 2A shows person A's perspective on a message list (postbox) 205 of mailbox 204 displayed by mail client 206, FIG. 2B shows person B's perspective on a message list (postbox) 211 of mailbox 210 displayed by mail client 212 and FIG. 2C shows person C's perspective on a message list (postbox) 217 of mailbox 216 displayed by mail client 218.

As illustrated in FIG. 2A, a mail client 206 of person A has a client interface 254, which is connected with person A's own mailbox 204 and with the virtual mailbox 252, and a message list 205. In actuality, the message list 205 is a way of illustrating a message database in the form of a table that is displayed to person A on a suitable display device (not shown in detail). The message list 205 has multiple columns, of which a subject column 205a, a person column 205b and a direction column 205c are shown in the figure. Additional columns may include a received or sent date, a priority, a message size, a completion indicator, reference to file attachments or others. Entries on one and the same message are each presented in one line in the message list 205. Thus, the client interface 254 sees both messages that have been deposited in the person's own mailbox 204 and messages that have been deposited in the virtual mailbox 252 of the external person E and displays them in person A's message list 205. Since the virtual mailbox 252 also contains messages that are also deposited in the person's own mailbox 204 because they are directed to person A or originate from person A (also referred to as own messages), and since it would be confusing if such own messages were to appear twice in the message list 207, the client interface 254 is set up to filter the own messages of person A from the messages of the virtual mailbox 252 or to block their display in the message list 207. Thus, each message that is deposited in both the person's own mailbox 204 and the virtual mailbox 252 will appear only once in the message list 207.

More precisely, not only the message traffic conducted with person A will appear in the message list 205, but also the message directed to person A, the message N2 directed to person B as well as the reply (message) N4 of person B and the message N3 directed to person C. The reply message N4 from person B is listed in a row below the message N2 directed to person B, indented and light-faced contrary to the own message traffic, which is displayed in bold, such that an intuitive optical association is ensured; in an additional option, not shown in detail, several back-and-forth messages and replies can be linked in the form of a tree or indicated by successive indentation. Alternatively, different message sequences may be preferred. For example, messages may be displayed in time sequence.

As illustrated in FIG. 2B, a mail client 212 of person B has a client interface 256, which is connected with person B's own mailbox 210 and with the virtual mailbox 252 and a message list 211. Reference is made to the description of person A's message list 205 regarding the structure and properties of message list 211. The client interface 256 sees both messages that have been deposited in the person's own mailbox 204 and messages that have been deposited in external person E's virtual mailbox 252 and displays them in person B's message list 211, wherein double-listing of own messages is avoided as in the above description for FIG. 2A.

As illustrated in FIG. 2C, a mail client 216 of person C has a client interface 258, which is connected with person C's own mailbox 214 and with the virtual mailbox 252 and a message list 217. Reference is made to the description of person A's message list 205 regarding the structure and properties of message list 217. The client interface 258 sees both messages that have been deposited in person C's own mailbox 216 and messages that have been deposited in external person E's virtual mailbox 252 and displays them in person B's message list 217, wherein double-listing of own messages is avoided as in the above description for FIG. 2A.

In summary, according to the illustrations in FIGS. 2A-2C, not only the message traffic conducted with the respective person appears in each of the message lists 205, 211, 217 but also all messages N1-N3 directed by the external person E to each internal person A, B, C, i.e., also the reply message N4 from person B. Thus, each of the persons A, B, C is informed about the entire message traffic with the external person E and can potentially coordinate his or her own answer, if still required, with the reply N4 from person B. Of course it is also possible that, prior to a reply, person B coordinates with persons A and C and they together agree on a consistent approach.

It is understood that the virtual mailbox 252 is visible only internally but not from the outside, such that the internal coordination is not transparent to the outside. I.e., the virtual mailbox 252 is located in an internal area 230, as is the case with all other virtual mailboxes. It is also possible to restrict the group of persons that has access to mailbox 252; in this case it is also possible that messages from person E that are addressed directly to an internal person who is excluded from the named group of persons are blocked by the server interface 250 or are forwarded to an administrator or to another decision-making entity.

It is furthermore understood that, in addition to the virtual mailbox 252, multiple additional virtual mailboxes can be connected to the client interfaces 254, 256, 258, depending on the number of set-up virtual mailboxes and on which virtual mailboxes are to be visible for the persons A, B, C.

Although the present invention has been described and illustrated based on an exemplary embodiment that refers to electronic message traffic (e-mails), the present invention is also applicable or expandable to other communication processes. For example, telephone messages that are exchanged via a telephone network not illustrated in detail, VoIP messages or chat entries that are exchanged via the internet 202, fax messages that are exchanged via the telephone network or the like can be mirrored into the virtual mailbox 252. For this purpose, the mail server 202 may include respective services such as a speech recognition service for converting spoken messages into text, a VoIP service, a chat service, an OCR service for recognizing text content and an image digitizing service for recognizing image content in fax messages, or the like. In particular the invention can also be applied to unified communication systems that integrate other communication data in addition to electronic message traffic. For example, a user could already receive information about the person with whom the external person E had the last conversation, or who in the company XYZ had called the external person, before making a call.

It should be pointed out that the image illustration of mail server 202 serves only to demonstrate the functional relationships of the invention and not so much the definition of device-related situations. Device-related details such as gateway entities, switch entities, address entities, message databases, communication units, bus systems and the like are well known to a person skilled in the art and were not illustrated in detail in order to focus on the subject matter of the present invention. It is also not critical to understanding the invention whether a server, gateway, message database, etc. are integrated in one device, for example, or are distributed to several devices. It is in particular understood that the integration of interface 250 and the virtual mailbox in the mail server 200 is to be considered exemplary and that the described functions could also be implemented using an entity that is associated with or not associated with or connected downstream and/or upstream of the mail server 220. Furthermore, functions assigned to the individual mail clients, in particular for message management, can also be performed by the mail server 200.

The features of the invention described in the shown embodiments can also exist in other embodiments of the invention, except when stated otherwise or when impossible for technical reasons.

I claim:

1. A method of managing communication processes between internal participants of an internal communication network and external participants, the method comprising:
   recognizing communication activities involving at least one external participant based on an identification assigned to the at least one external participant for storing communications in a virtual mailbox assigned to the at least one external participant;
   depositing each communication activity recognized as being associated with the at least one external participant in the virtual mailbox such that the deposited communication activity is accessible via access to the virtual mailbox;
   releasing the virtual mailbox to at least one selected internal participant by:
     permitting the virtual mailbox to be accessed by a first internal participant via the internal communication network;
     communicating communications of the communication activities from the virtual mailbox to a first device of the first internal participant along with communications from at least one mailbox of the first internal participant such that the communications of the communication activities stored in the virtual mailbox and communications from at least one mailbox of the first internal participant are displayable in a single interface via the first device.

2. The method of claim 1, wherein the internal participants comprise a second internal participant and a third internal participant; and
   wherein the releasing the virtual mailbox to at least one selected internal participant also comprises:
     permitting the virtual mailbox to be accessed by the second internal participant of the internal participants of the internal communication network; and
     communicating communications of the communication activities from the virtual mailbox to a second device of the second internal participant along with communications from at least one mailbox of the second internal participant such that the communications of the communication activities and the communications from the at least one mailbox of the second internal participant are displayable in a single interface via the second device.

3. The method of claim 2, wherein at least one device of the internal network that hosts the virtual mailbox and the method also comprising:
   the communications server hosting the virtual mailbox and the at least one mailbox of the first internal participant, the at least one mailbox of the second internal participant, and the at least one mailbox of the third internal participant.

4. The method of claim 3, wherein the at least one device of the internal network that hosts the virtual mailbox comprises a communication server.

5. The method of claim 4, wherein the communication server is a mail server that hosts the at least one mailbox of the first internal participant and the at least one mailbox of the second internal participant.

6. The method of claim 4, wherein the communication server performs the communicating of the communications of the communication activities from the virtual mailbox to the second device of the second internal participant along with communications from at least one mailbox of the second internal participant and the communication server performs the communicating of the communications of the communication activities from the virtual mailbox to the first device of the first internal participant along with communications from at least one mailbox of the first internal participant.

7. The method of claim 6, comprising:
displaying, by the first device, the single interface such that a double listing of a message in the at least one mailbox of the first internal participant and that same message in the virtual mailbox is avoided.

8. The method of claim 7, comprising:
displaying, by the second device, the single interface such that a double listing of a message in the at least one mailbox of the second internal participant and that same message in the virtual mailbox is avoided.

9. The method of claim 1, wherein:
the communicating of the communications of the communication activities from the virtual mailbox to the first device of the first internal participant along with communications from at least one mailbox of the first internal participant is performed such that a double listing of a message in the at least one mailbox of the first internal participant and that same message in the virtual mailbox is avoided.

10. The method of claim 9, comprising:
displaying, by the first device, the single interface such that messages of the communications of the communication activities of the virtual mailbox and messages of the communications from the at least one mailbox of the first internal participant are displayed in temporal sequence.

11. The method of claim 1, wherein the communications of the communication activities of the virtual mailbox comprise email messages, and at least one of: chat entries exchanged via the internet, fax messages, and voice mail messages.

12. The method of claim 11, comprising:
recognizing a communication activity involving the at least one external participant and at least one of the first internal participant as being private and preventing the communication activity recognized as being private from being accessible via the virtual mailbox.

13. The method of claim 12, comprising:
receiving input from the first internal participant that identifies the communication activity recognized as being private as a private communication such that at least one device of the internal network recognizes the communication activity as being private to prevent the communication activity from being assessable via the virtual mailbox.

14. The method of claim 1, wherein the first device is a communication device configured to run a first mail client.

15. A non-transitory computer readable medium having a program stored therein that defines a method that is performable by a device of an internal communication network that executes the program, the method comprising:
setting up in the internal communication network a list of incoming and outgoing communication activities between the internal participants and at least one external participant as a virtual mailbox that is assigned to the at least one external participant by:
setting up a list of incoming and outgoing communication activities involving the at least one external participant as the virtual mailbox such that the virtual mailbox is hosted by the device of the internal communication network such that the virtual mailbox is invisible and inaccessible to the at least one external participant;
recognizing communication activities involving the at least one external participant based on an identification assigned to the at least one external participant;
depositing each communication activity recognized as being associated with the at least one external participant in the virtual mailbox such that the deposited communication activity is accessible via access to the virtual mailbox;
releasing the virtual mailbox to at least one selected internal participant by:
permitting the virtual mailbox to be accessed by internal participants via the internal communication network, the internal participants comprising a first internal participant;
communicating communications of the communication activities from the virtual mailbox to a first device of the first internal participant along with communications from at least one mailbox of the first internal participant such that the communications of the communication activities and the communications from the at least one mailbox of the first internal participant are displayable in a single interface via the first device.

16. The non-transitory computer readable medium of claim 15, wherein the method also comprises:
recognizing a communication activity involving the at least one external participant and the first internal participant as being private and preventing the communication activity recognized as being private from being accessible via the virtual mailbox.

17. The non-transitory computer readable medium of claim 15, wherein:
the communicating of the communications of the communication activities from the virtual mailbox to the first device of the first internal participant along with communications from at least one mailbox of the first internal participant is performed such that a double listing of a message in the at least one mailbox of the first internal participant and that same message in the virtual mailbox is avoided.

18. The non-transitory computer readable medium of claim 15, wherein the device of the internal communication network that is to execute the program is a workstation, a communications server computer, a mail server computer, or a computer device of the internal communication network.

19. A communication system comprising:
an internal network comprising:
an internal network device configured to host a virtual mailbox, and
a first communication device of a first internal participant;
the internal network device communicatively connectable to the first communication device;
the internal network device configured to set up a list of incoming and outgoing communication activities between at least one external participant and at least one of the first internal participant and a second internal participant as a virtual mailbox that is assigned to the at least one external participant;

the internal network device configured to recognize communication activities involving the at least one external participant based on an identification assigned to the at least one external participant and deposit each communication activity recognized as being associated with the at least one external participant in the virtual mailbox such that the deposited communication activity is accessible via access to the virtual mailbox;

the internal network device configured to release the virtual mailbox to the first internal participant by:
communicating communications of the communication activities from the virtual mailbox to the first communication device of the first internal participant along with communications from at least one mailbox of the first internal participant such that the communications of the communication activities and the communications from the at least one mailbox of the first internal participant are displayable in a single interface via the first communication device.

20. The system of claim 19, wherein
the internal network device is configured to communicate the communications of the communication activities from the virtual mailbox to the first communication device along with communications from at least one mailbox of the first internal participant such that a double listing of a message in the at least one mailbox of the first participant and that same message in the virtual mailbox is avoided; and wherein the internal network device is configured to recognize a communication activity involving the at least one external participant and at least one of the first internal participant as being private and prevent a communication of the communication activity recognized as being private from being accessible via the virtual mailbox.

* * * * *